S. P. THACHER.
MATERIAL FOR CONTAINERS OR OTHER LIKE ARTICLES.
APPLICATION FILED NOV. 6, 1917.

1,309,971.

Patented July 15, 1919.

Attest:
S. G. Taylor

Inventor:
Sheldon P. Thacher,
by Ernest Hopkinson
his Atty.

UNITED STATES PATENT OFFICE.

SHELDON P. THACHER, OF WEEHAWKEN, NEW JERSEY, ASSIGNOR TO NEW YORK BELTING AND PACKING COMPANY, A CORPORATION OF NEW YORK.

MATERIAL FOR CONTAINERS OR OTHER LIKE ARTICLES.

1,309,971. Specification of Letters Patent. Patented July 15, 1919.

Application filed November 6, 1917. Serial No. 200,513.

*To all whom it may concern:*

Be it known that I, SHELDON P. THACHER, a citizen of the United States, residing at Weehawken, county of Hudson, and State of New Jersey, have invented certain new and useful Improvements in Materials for Containers or other like Articles, of which the following is a full, clear, and exact description.

My invention relates to material for containers and other like articles, and more particularly to material of this character embodying therein vulcanized rubber.

Heretofore containers or other like articles used in the handling of fluids, have been made of soft rubber composition because this material possesses the characteristics of being resilient, flexible, and fluid-proof. It has been found, however, that such articles when used in the handling or storage of gasolene, or other like fluids, which are so-called solvents of rubber, rapidly deteriorate by reason of the deleterious action of gasolene, or other similar fluid thereon. It has heretofore been attempted to make these articles of rubber, and to provide this rubber with a superficial coating of a material which will resist the action of gasolene or other fluid thereon, but it has been found that such coatings do not possess sufficient elasticity or coherence to avoid the formation of minute cracks or openings therein, thus permitting the penetration of the gasolene, or other fluid, into contact with the rubber with a resultant rapid deterioration thereof.

By my present invention I provide a material, for making containers or other like articles, having the surface or surfaces which, when in use, contact with gasolene, or other fluids deleterious to rubber, formed of a material insoluble in and impermeable by the gasolene or other fluid so as to protect the rubber and preclude any possibility of the gasolene, or other fluid, contacting therewith, or acting thereon in a manner to weaken or otherwise deleteriously affect same. This material will possess the desired strength and flexibility and will be thoroughly impervious to the fluid contained therein.

The invention consists in a material for use in making containers, or other like articles, possessing the novel features of construction and characteristics hereinafter set forth and described and more particularly pointed out in the claims hereto appended.

Referring to the drawings.

Like reference numerals refer to like parts throughout the several views.

Figure 1:
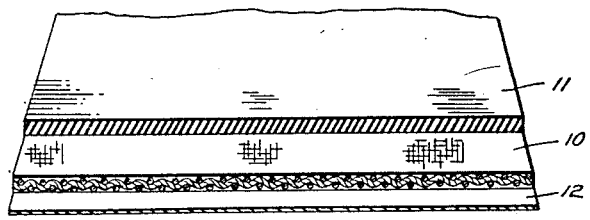
Figure 1 is a view partly in perspective and partly in section, showing conventionally one embodiment of the invention.

In Fig. 1 of the drawings, I have shown an embodiment of my invention consisting of a ply 10 of textile absorbent material having applied to one surface thereof, a ply of rubber 11. These two plies may be associated or united in any desired manner, as by the friction process which consists in passing a layer of rubber and a strip of fabric superimposed, one upon the other, between a pair of pressure rolls, rotating at different speeds so as to force the rubber into the desired permanent union with one surface of the fabric. If it be desired to provide a thicker ply of rubber than can be applied by this process, one or more skim coats may be added to this ply of rubber. Other methods of associating or uniting the ply of rubber, and the ply of fabric or other absorbent material, may be employed if desired.

In articles made of material embodying my invention, the face of the ply 10 of fabric or other fibrous material will be presented toward that surface of the article with which gasolene or other liquids deleterious to rubber, contacts; and since this fabric or other fibrous material alone will not protect the rubber ply 11 from the action of such fluids, because of its porosity as well as its absorption properties, I provide the fabric, or other fibrous material with a protecting coating which will not only prevent absorption of the fluid thereby with a resultant loss of the bond between it and the rubber ply 11, but will also fill the interstices in the fabric, or other fibrous material, and thus present a substantially uninterrupted surfacing for the rubber ply which by reason of the multitude of anchor points afforded by the fibers of the fabric or other absorbent fibrous material, will not crack with the frequent flexure of the material. To secure the desired result, the material of this protection coating must be insoluble by gasolene, or other similar fluids and must not deteriorate from constantly being subjected to the action thereof.

This coating may be of a solution, the base of which is shellac, or other similar gums; glue, or other suitable materials capable of being brought to a viscous condition, and having no reaction upon rubber, or rubber solutions. In practice, I have found that a solution of orange shellac in methyl-alcohol gives highly satisfactory results.

This solution is applied to the fabric or other absorbent fibrous material of the ply 10 after vulcanization of the rubber ply 11, the manner of application being either by dipping the material in the solution, or by spreading the solution by means of a brush, or other well known coating appliances. The solution is used in sufficient quantities to thoroughly saturate or impregnate the fabric or other absorbent material and completely fill the interstices between the fibers of the absorbent material, or different strands of the fabric. In the accompanying drawings, I have indicated the protecting coating at 12, the showing of the coating being merely conventional.

Figure 2:
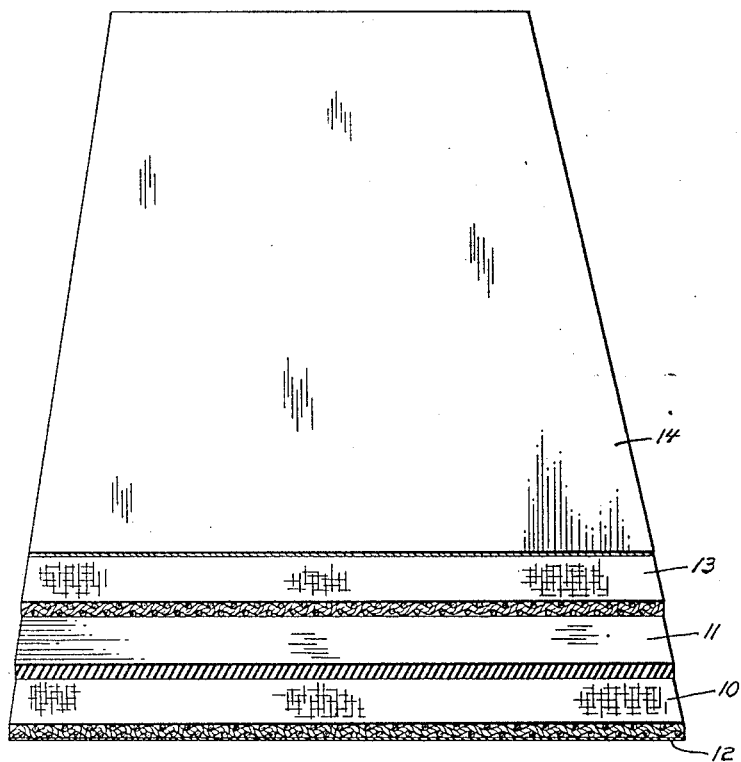
Fig. 2 is a similar view showing another embodiment thereof.

The relation in which some articles made from material embodying my invention, are used, is such as to expose both sides of this article to the action of gasolene, or other similar fluid, and to adapt the material to the production of such article; I may embody in the material the characteristics shown in Fig. 2 of the drawings.

In this embodiment of the invention, I employ in addition to the plies 10—11 and 12, a ply 13 similar to the ply 10 and a protective coating 14 similar to the coating 12, the ply 11 of rubber thus being positioned between two protective facings. In forming the ply 11, each of the plies 10 and 13 may be frictioned and thickened by a skim coating, and the rubber faces of the fabric thereafter cemented together. Or if desired, a layer of rubber having the fabric or other absorbent material cemented thereto, either before or after vulcanization, may be used.

Material embodying my invention possesses the desired strength, flexibility and resiliency to adopt it for use in making or lining various types of containers such as tanks, buckets, hose, etc., and may also be advantageously used for pump diaphragms.

The fabric or other absorbent fibrous material will prevent undue deformation of the article while in use, thus minimizing likelihood of the disintegration or rupture of the protective facing, and preserving in the facing its impermeability to gasolene, or other fluids.

It is not my intention to limit the invention to the details of construction shown in the drawings and herein described, nor to any particular method of associating or uniting the various strata, it being apparent that such may be varied without departing from the spirit and scope of the invention.

Having thus described my invention what I claim and desire to protect by Letters Patent is:

1. A material for making containers and other like articles embodying a ply of fibrous material, a ply of vulcanized rubber on one side thereof and a coating impermeable by fluids deleterious to the rubber, upon the other side thereof.

2. A material for making containers and other like articles embodying a ply of fibrous material, a ply of vulcanized rubber on one side thereof and a protective coating insoluble in and impermeable by fluids deleterious to the rubber upon the other side thereof.

3. A material for making containers and other like articles embodying a ply of fabric, a ply of rubber vulcanized to one side of said fabric, and a coating upon the other side of said fabric and filling the interstices therein, said coating being impermeable by fluids deleterious to the rubber.

4. A material for making containers and other like articles embodying a ply of fibrous material, a ply of vulcanized rubber on one side thereof and a coating of shellac, upon the other side thereof.

5. A material for making containers and other like articles embodying a plurality of plies of fibrous material, a ply of vulcanized rubber between said plies of fabric and a coating impermeable to fluids deleterious to the rubber upon the other side of each of said plies of fabric.

6. A material for making containers and other like articles embodying a plurality of plies of fabric, a ply of rubber between and vulcanized to said plies of fabric, and a coating upon the other side of each of said plies of fabric, and filling the interstices therein, said coating being impermeable to fluids deleterious to the rubber.

7. A material for making containers and other like articles embodying a plurality of plies of fabric, a ply of rubber between and vulcanized to said plies of fabric, and a coating of shellac upon the other side of each of said plies of fabric, and filling the interstices therein.

8. A material for making containers and other like articles embodying a ply of textile material, a ply of vulcanized rubber on one side thereof and a coating of shellac directly applied to the other side thereof.

9. A material for making containers and other like articles embodying a plurality of plies of fabric, a ply of vulcanized rubber on one side thereof and a coating of shellac directly applied to the other side of each of said plies of fabric.

Signed at New York, N. Y., this 31st day of October, 1917.

SHELDON P. THACHER.